UNITED STATES PATENT OFFICE.

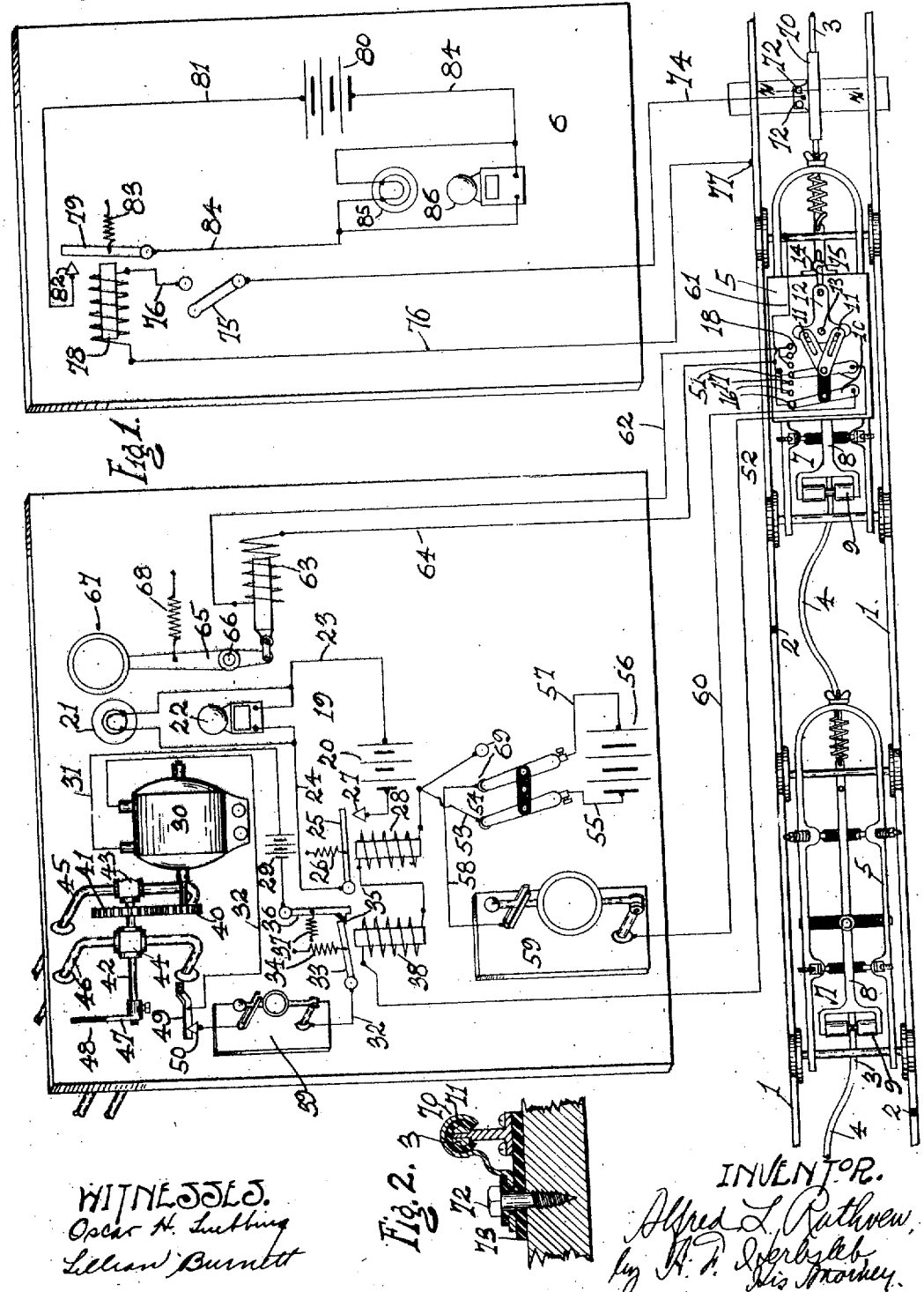

ALFRED L. RUTHVEN, OF TOPEKA, KANSAS, ASSIGNOR TO RUTHVEN RAILWAY SIGNAL COMPANY, OF PHOENIX, ARIZONA TERRITORY, A CORPORATION OF ARIZONA TERRITORY.

SIGNAL SYSTEM FOR RAILWAYS.

989,194.

Specification of Letters Patent. Patented Apr. 11, 1911.

Application filed February 20, 1909. Serial No. 479,020.

*To all whom it may concern:*

Be it known that I, ALFRED L. RUTHVEN, a citizen of the United States, residing at Topeka, in the county of Shawnee and State of Kansas, have invented certain new and useful Improvements in Signal Systems for Railways, of which the following is a specification.

My invention relates to signal systems for railways and is an improvement upon the apparatus shown, described and claimed in Letters Patent of the United States No. 883,350, granted me March 31, 1908.

It is the object of my present invention to increase the efficiency of the apparatus shown and described in my aforesaid Letters Patent, and the invention will be readily understood from the following description and claims, and from the drawings, in which latter:

Figure 1 represents a diagram of a track divided into blocks, with a car or locomotive upon the track and a station alongside the track equipped with my improved apparatus. Fig. 2 is a detail in cross-section showing the manner of mounting the local contact-part.

My present improvements coöperate with the apparatus shown, described and claimed in my aforesaid patent in such manner as to produce new and combined functions and effects, and for this reason I have herein reproduced so much of the aforesaid apparatus as is necessary to a proper understanding of my present invention. I shall first describe such reproduced part of said apparatus, and then describe the same in connection with my improvements and disclose their coöperation and their new and improved combined or dependent functions and effects.

1 represents the track which is insulated into blocks of suitable length by insulation points 2, which are shown arranged alternately in the respective rails so that the opposite rails of the various blocks may overlap.

3 is a third rail or continuous conductor which is insulated from both of the track rails, and is preferably higher than the level of the track rails so that interference with its functions may not be occasioned at the cross-overs or the switches. The third rail or continuous conductor is preferably provided with offsets 4 opposite the points of insulation of the track rails, although these offsets may be placed at other suitable intervals.

5 designates the vehicle, such as a car or locomotive, on which part of my improved mechanism is located, and so arranged that the signals may be received by the driver or engineer of the vehicle. The vehicle carries a trolley 7, shown as comprising the bar 8 provided with a grooved wheel 9, the groove whereof is received by the continuous conductor 3, and so arranged that when the trolley-wheel passes over the offset 4 it will be deflected for purposes presently to be described. The trolley bar 8 is pivotally mounted and means are provided for yieldingly maintaining electric contact with the continuous conductor but so arranged as to prevent undue yield thereof, as more particularly described in my aforesaid patent.

10 is an automatic pole-changer which is automatically operated by the trolley whenever the trolley-wheel 9 passes around one of the offsets 4. The connection between the trolley and pole-changer is made through a pair of links 11 pivoted at the rear ends to the pole-changer, a T-lever 12 loosely connected to the forward ends of said links and pivotally mounted upon a pin 13 on the vehicle 5, and a crank 14 mounted in a bearing 15 and connected to the forward end of the T-lever and the trolley bar 8. When the trolley-wheel 9 passes around one of the offsets 4, the forward end of the trolley-bar will be swung laterally for swinging the respective arms of the automatic pole-changer out of contact with the terminals 16 and one of the terminals 17 and into successive contact with the terminals 17 and 18, and when the vehicle is traveling in the opposite direction the same operation will take place except that the pole-changer will be actuated by the other link 11. By thus automatically shifting the pole-changer upon entering a block, the presence of another vehicle in that block will be indicated by signals on both vehicles. The reason for shifting the poles on the incoming vehicle is to insure that a signal be given by preventing the same poles of the batteries on both vehicles being connected with the continuous rail.

There is a signal circuit 19 on the vehicle, which may also be called a traveling signal circuit, shown as comprising a battery 20, a lamp 21, a bell 22, an electric conductor 23 connecting one of the poles of the battery with one of the poles of the lamp and bell, and an electric conductor 24 connecting the other pole of the battery with the other poles of the lamp and bell, a switch in the form of an armature 25 normally retracted by a spring 26 and arranged to contact a contact-point 27, being interposed in the last-named conductor, the armature being arranged to be attracted into contact with said contact-point by an electro-magnet 28. The armature 25 forms a normally open automatic switch for said traveling signal circuit, and the electro-magnet 28 forms an automatic switch-closing device for said last-named switch. There may also be a train stopping circuit on the vehicle which is shown comprising a battery 29, a motor 30, an electric conductor 31 connecting one pole of the battery with one pole of the motor and an electric conductor 32 connecting the other pole of the battery with the other pole of the motor. There is a switch in this circuit shown in the form of an armature 33 normally retracted by a spring 34 into contact with an insulated block 35 on an arm 36 pressed toward the armature by a spring 37, an electro-magnet 38 being arranged to attract said armature into electric contact with said arm. A manually operable switch 39 is also shown in this circuit.

The motor operates a pinion 40 meshing with a gear 41 on a shaft 42 which operates a valve 43 and a valve 44, the valve 43 being in a pipe 45 connecting with suitable throttle-lever mechanism for shutting off the steam of the locomotive, and the valve 44 being in a pipe 46, which communicates with the air-brake system. This motor-actuated mechanism may be such as is more fully shown and described in my aforesaid patent. There is an arm 47 on said shaft 42, the insulated end 48 of which is arranged to engage a switch 49 normally engaging a contact-terminal 50 in said train-stopping circuit, for opening said switch when said valves have been opened and thereby stopping said motor. The main circuit on said vehicle, which may also be termed the traveling main circuit, as shown, comprises the trolley, which is in contact with the third rail or continuous conductor 3 and through a wire 51 and one of the terminals 17 connects with one arm of the automatic pole-changer 10, a wire 52, the magnets 38 and 28, a wire 53, one arm of a manually operable pole-changer 54, a wire 55, the main battery 56, a wire 57, the other arm of the manually operable pole-changer, a wire 58, a main switch 59, a wire 60, the other arm of the automatic pole-changer, the contact-terminal 16 and a wire 61 to the running gear of the car or locomotive, whereby communication is made with the respective blocks or sections of the track-rails. The circuit is normally open or interrupted between the conductor 3 and the track-rails, thus forming an interrupted main traveling circuit.

If a vehicle is already on a block and another vehicle traveling in the same direction enters the block, the automatic pole-changer on the incoming vehicle will be deflected and the signals on both trains operated, and in addition, the following operation on the incoming vehicle takes place: The arms of the automatic pole-changer being deflected, these arms will pass from contact with the terminal 16 and one of the terminals 17, to successive contact with the terminals 17 and 18, the terminals 18 having connection with a wire 62 connecting with a solenoid 63, a wire 64 connecting the solenoid with the wire 61. The core of the solenoid is articulated with a target-lever 65, which is pivoted at 66 in position to swing a translucent target 67, preferably red, in front of the lamp 21 against the action of a retractable spring 68. The signals on both trains and the movement of the target on the incoming train will be intermittent for notifying the drivers of both vehicles that they are traveling in the same direction, while the movement of the target on the incoming vehicle only will advise the driver of the incoming vehicle that his is the incoming vehicle.

If two vehicles enter or are on the same block traveling head-on, the drivers of both vehicles will be notified of that fact by the continuous operation of the signals and the actuation of the train-stopping devices.

When the direction of travel of the vehicle is reversed, the arms of the pole-changer 54 are shifted into engagement with the contact-points 69.

As thus far described, the parts are substantially the same as a portion of the apparatus shown and described in my aforesaid patent, but coöperating therewith I employ the following instrumentalities: 6 represents a station, such as an ordinary passenger or freight station alongside the railroad, and in which also part of my improved mechanism is located. In order that the electrical connections and efficiency of my improved device may be tested from time to time and also to insure that the station agent may know that said electrical connections and efficiency are sufficiently safe for the train to proceed, I have so connected these electrical connections on the vehicle with electrical connections at the station that indication will be had on the vehicle and at the station of improper electric connections or lack of efficiency, the parts coöperating in novel manner for the purpose intended. Thus I provide a local contact-part 70 preferably in the form of a hood received over the continuous conductor 3 but insulated therefrom by insulation 71, the local contact-part being shown secured to a tie by bolts 72, and insulated from said tie by insulation 73. This local-contact-part may be of suitable length. An electrical conductor 74 connects said contact-part with one pole of the switch 75, the other pole of said switch having an electrical conductor 76 connected therewith, this latter conductor also connecting with one of the sections of said track-rails at 77, there being an electro-magnet 78 in said conductor for attracting an armature 79 when the circuit is closed. These parts form local closing means for the traveling main circuit.

There is a signal circuit at the station, which may also be called a local signal circuit, comprising a battery 80, an electrical conductor 81 connected to a contact-point 82 against which the armature 79 is received when said armature is attracted by the core of the electro-magnet 78, against the tension of a retractile spring 83, an electric conductor 84 connecting with said armature and with the battery, there being a lamp 85 and a bell 86 interposed in said last-named conductor. The armature 79 forms a normally open automatic switch for said local or station signal-circuit, and the electro-magnet 78 forms an automatic switch-closing device for said last-named switch. If now a vehicle passes along the track and its trolley-wheel 9 makes contact with the local contact-part 70, the switch 75 being closed, the main circuit on the vehicle, which is also acted on by a vehicle in the same block, as heretofore explained, will be closed by said local closing means therefor for energizing the main or actuating circuit on the vehicle and the electric connections therefor at the station, by which energizing the signal circuit on the vehicle will be closed by the attraction of the armature of magnet 28, and the motor circuit on the vehicle closed by the attraction of the armature 38, while at the same time the signal circuit at the station, or local signal circuit, will be closed by the attraction of the armature 79, the signals being actuated if the electric connections and efficiency are proper. If the electrical connections or efficiency are not proper no signal will be received on the vehicle or at the station, indicating to the station agent that the electrical connections or efficiency are not proper, who may then take immediate steps to stop the vehicle, and the driver of the vehicle will also be notified that such electrical connections or efficiency are not proper, it being then his duty to immediately stop the vehicle until the difficulty can be remedied.

The local closing means act partially through the same circuits and parts upon the vehicle which are employed or actuated upon presence of an additional vehicle upon the same block, and coact therewith for forming new circuits performing new functions and effects.

My improved device forms a ready means for signaling by the station agent to the driver of the vehicle by the manipulation of the switch 75. Thus if the driver of the vehicle fails to receive proper local signal by reason of the switch 75 being opened, the driver of the vehicle will stop at the station. If proper local signal is received on the vehicle, the driver may at once open switch 39 for avoiding automatic stopping of the train.

Having thus fully described my invention what I claim as new and desire to secure by Letters Patent is:

1. In an automatic electric signaling system for railways, the combination with the usual track rails, of a third rail co-extensive therewith, a vehicle movable along said track rails, a trolley wheel carried by said vehicle and engaging said third rail, a traveling partial circuit carried by said vehicle and including a battery and translating device, said partial circuit terminating in said trolley wheel and in the wheels of the vehicle, a local contact strip overlying said third rail but insulated therefrom, and arranged in alinement therewith, and a local partial circuit extending from said contact strip to one of said track rails, a signal controlled by said circuit, whereby, when the trolley wheel engages said contact strip, said partial circuits are mutually completed, and both said translating device and signal actuated, and means in said local partial circuit for controlling the operation of said translating device.

2. In an automatic electric signaling system for railways, the combination with the usual track rails, of a third rail co-extensive therewith, one of said rails being divided into insulated sections, vehicles movable along said track rails, a traveling partial circuit carried by each of said vehicles, such circuit including a battery and a translating device, a trolley wheel carried by each of said vehicles in engagement with said third rail, said partial circuit terminating at one side in the wheels of the vehicle, and at the other side in said trolley wheel, whereby when two vehicles come upon the same section their partial circuits will be mutually completed, a contact device arranged parallel with and adjacent said third rail but insulated therefrom, and adapted to be engaged by the trolley wheel of a passing vehicle, and a local partial circuit extending from such contact device to one of said track rails, and including a translating device and a switch, whereby when said switch is closed and when a trolley wheel engages such contact device, both the traveling and local partial circuits will be completed, and both translating devices actuated, and whereby, by opening such switch, said devices may be prevented from
5 operating when a trolley engages the contact, and a warning thus given to the driver of the vehicle.

In testimony whereof I have subscribed my name hereto in the presence of two subscribing witnesses.

ALFRED L. RUTHVEN.

Witnesses:
LILLIAN BURNETT,
JOHN R. SCHINDEL.

Copies of this patent may be obtained for five cents each, by addressing the "Commissioner of Patents, Washington, D. C."